Figure 1:
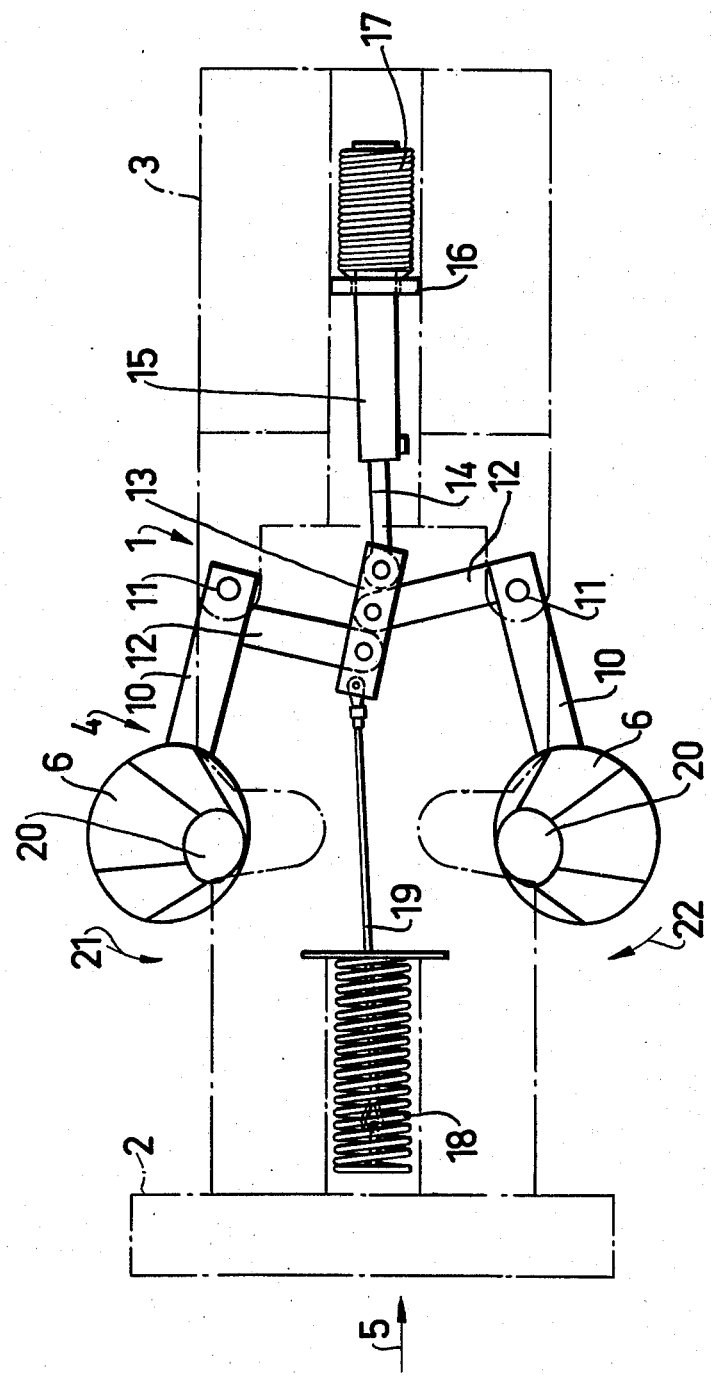

United States Patent [19]

Bergholm et al.

[11] 3,994,327
[45] Nov. 30, 1976

[54] FEEDING DEVICE FOR ADVANCING UNDELIMBED TREE TRUNKS

[75] Inventors: Lennart Bergholm, Umea; Jan-Eje Ericsson, Sundsvall, both of Sweden

[73] Assignee: Umea Mekaniska AB, Umea, Sweden

[22] Filed: Mar. 4, 1975

[21] Appl. No.: 555,232

[30] Foreign Application Priority Data
Apr. 26, 1974 Sweden .............................. 7405631

[52] U.S. Cl. .............................. 144/246 F; 144/2 Z; 144/246 C; 198/624; 198/722
[51] Int. Cl.² ...................... B27B 31/00; B27C 1/12
[58] Field of Search ......... 144/246 R, 246 C, 246 F, 144/208 R, 208 F, 2 Z, 309 AC, 311, 247, 249 B, 3 D; 198/127 R

[56] References Cited
UNITED STATES PATENTS

| | | | |
|---|---|---|---|
| 3,068,918 | 12/1962 | Smith | 198/127 R X |
| 3,189,162 | 6/1965 | Brondell et al. | 198/127 R |
| 3,709,267 | 1/1973 | Kurelek | 144/2 Z |

*Primary Examiner*—Robert Louis Spruill
*Assistant Examiner*—W. D. Bray
*Attorney, Agent, or Firm*—Pierce, Scheffler & Parker

[57] ABSTRACT

A feeding device for use with tree processing machines such as delimbing, barking and slashing machines wherein feed rolls are provided on each side of a feed path for the tree trunk. The feed rolls have a conical configuration and are mounted for rotation about axes inclined to each other at an angle equal to the base angle of the rolls. The surfaces of the feed rolls facing towards each other lie parallel and have a greater radial distance to the axis of rotation at the base portion of the feed rolls than at the upper portion thereof. This arrangement establishes a greater feeding force at the upper portion of the feed rolls than at the base portion and a circumferential speed for the feed rolls which is highest at the base portion and lowest at the upper portion thereby enabling tree trunks having relatively smaller diameters to be advanced through the rolls at relatively higher speeds.

5 Claims, 3 Drawing Figures

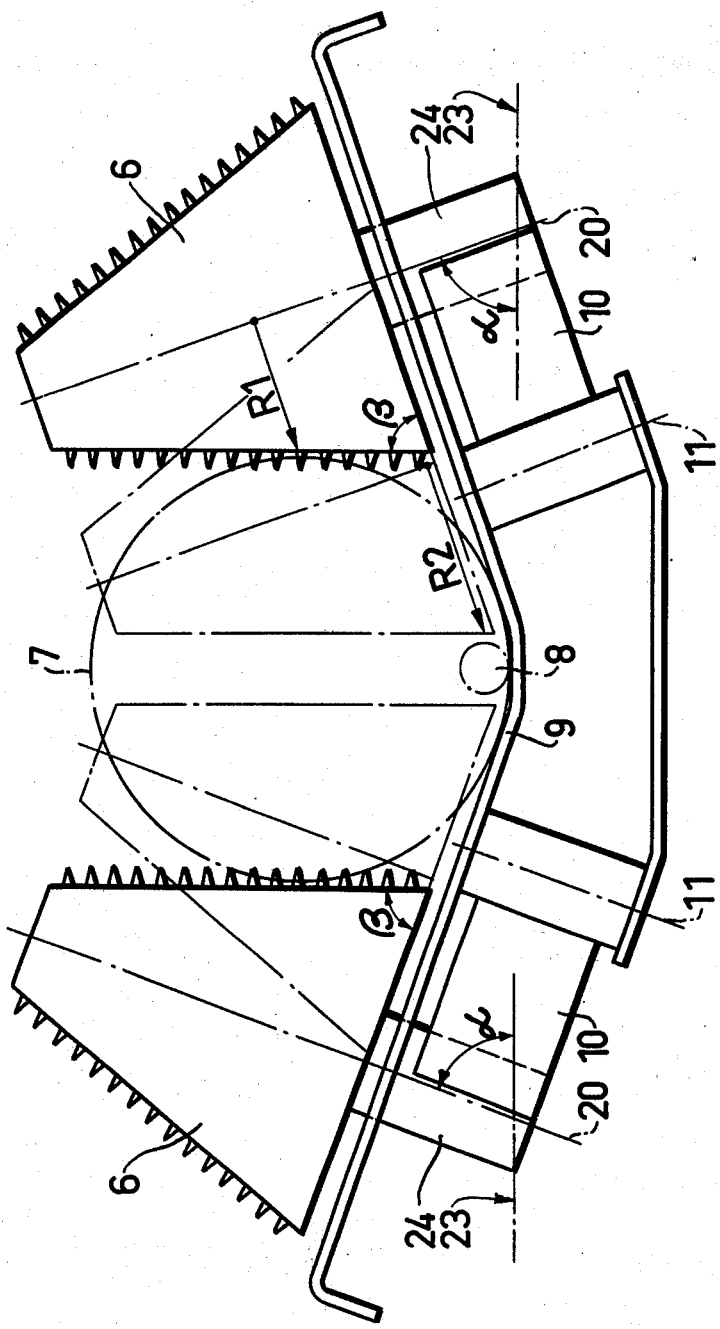

FEEDING DEVICE FOR ADVANCING UNDELIMBED TREE TRUNKS

This invention relates to a feeding device, preferably but not exclusively for use with tree processing machines for example delimbing, barking or slashing machines. Said device comprises at least two feed rolls arranged one on each side of a feed path.

Feeding devices of this kind are previously known for use with tree processors, particularly machines for delimbing felled trees. They comprise substantially cylindric feed rolls, the rotation axles of which are arranged vertically or horizontally, depending on whether the delimbing unit is intended to be used for tree trunks positioned from above or from the side. In both said cases, the trunks can be moved simultaneously into the delimbing unit and in between the feed rolls, which for this purpose can be moved apart.

Specially at feeding devices intended for machines delimbing felled trees and provided with vertically arranged feed rolls, the feed rolls are mounted on support arms, which are pivotally attached to the machine stand about vertical swing axles and so connected to each other, that the inward and outward swing movements of the feed rolls in relation to the trunk are of substantially equal size, and the distance between the swing axles is so great, that the contact pressure of the feed rolls against the trunk increases as the force exerted by the feed rolls and advancing the trunk increases. Hereby a so-called self-tightening effect is produced which is particularly high at the feed of trunks with small diameter, but which decreases with increasing diameter of the trunks. This is, however, completely wrong, because trunks with greater diameter normally show a considerably higher feed resistance than trunks with smaller diameter and, consequently, require a greater feeding force than said latter ones, and not vice versa, as is the case with this known type of feeding device for delimbers of felled trees. It was also found, that at this type of feeding device the pressure of the feed rolls against trunks with small diameter can be so high, even at normal feed resistance, that along the entire trunk the wood is damaged.

The present invention, therefore, has as its object to produce a feeding device with feed rolls which does not show the aforesaid disadvantages, and which is so designed, that the feeding force of the feed rolls increases with increasing diameter of the trunks. This object is achieved thereby at the feeding device according to the invention has the characterizing features defined in the claims. According to the characterizing features defined in the main claim, the rotation axles of the feed rolls are so arranged that they intersect one another at their extension at an angle, the bisector plane of which has substantially the same perpendicular distance to all points on the feed roll surfaces facing toward said plane, and that corresponding points on the surfaces of the respective feed rolls facing toward said plane are located at the same radial distance from the rotation axle of the associated feed roll.

According to a preferred embodiment, the feed rolls may be of conical shape and their rotation axles be inclined to each other at an angle to a plane perpendicular to said bisector plane which is equal to the base angle of the conical feed rolls. Hereby, the surfaces of the feed rolls facing toward each other will be in parallel and have a greater radial distance to the rotation axle at the base portion of the feed rolls than at the upper portion thereof. This implies that the feeding force is greatest at the upper portion of the feed rolls and smallest at the base portion thereof, and that the circumferential speed of the feed rolls is highest at their base portion and lowest at their upper portion. Consequently, trunks with small diameter can be advanced at a much higher speed than it has been possible with the known feeding devices, and thereby the feeding device according to the present invention also has a capacity much higher than that of known feeding devices.

The afore-described feeding device according to the invention has been related to machines for processing tree trunks. The device, however, is not restricted to such machines, but may be utilized also at other machines, which are not intended for processing tree trunks.

Figure 2:
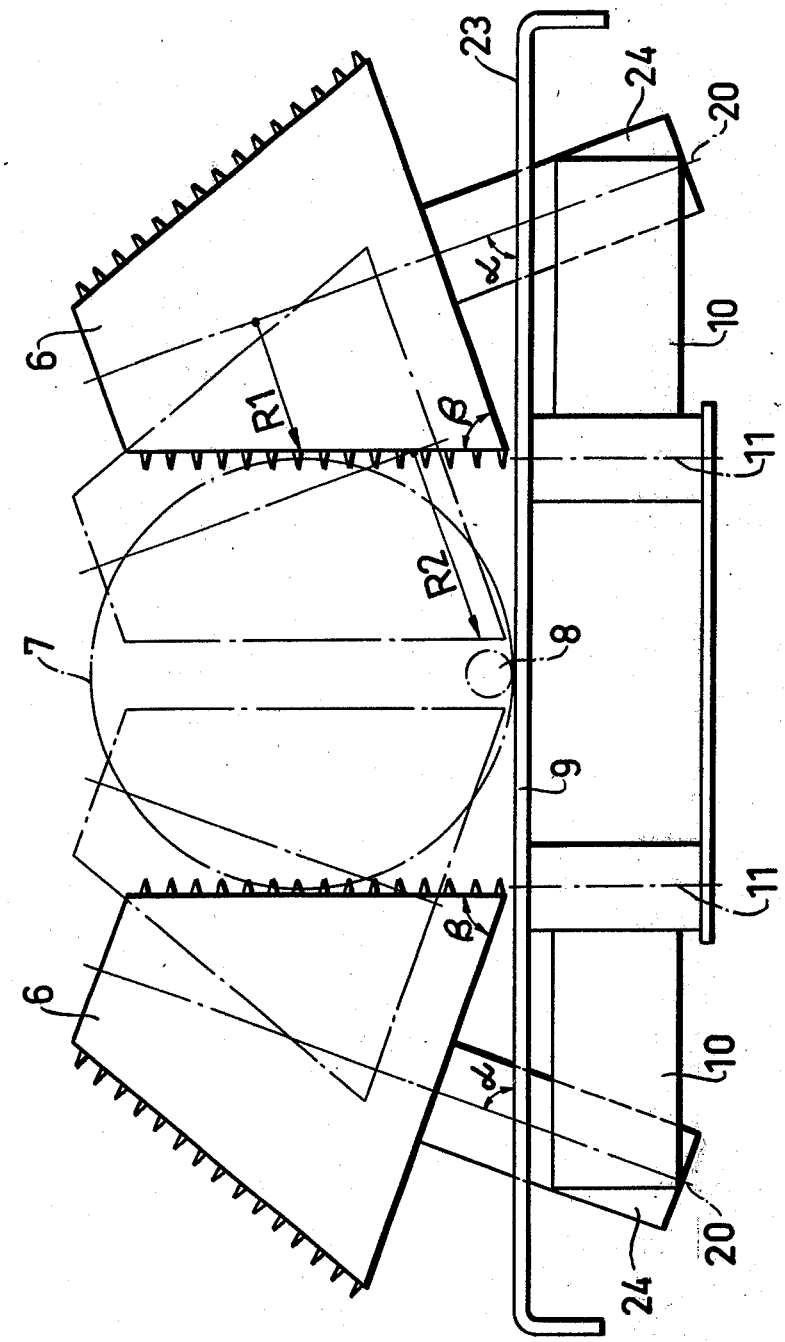

The invention is described in greater detail in the following, with reference to the accompanying drawings, in which FIG. 1 is a schematic top view of a feeding device according to the invention applied to a machine for processing felled trees, FIG. 2 is a section, seen against the tree feed direction through the machines of feed rolls comprised in the feeding device, and FIG. 3 is a section similar to that in FIG. 2, but through a modified embodiment.

In FIG. 2 a machine for processing felled trees, at which a feeding device according to the invention is utilized to feed undelimbed trees through the machine, is indicated entirely schematically by way of rectangles with dash-dotted lines. Said machine may be of any type, which is capable to be arranged stationary or be moved in the terrain either carried on a tractor, dragged by a traction vehicle or as a self-propelling unit, and which may comprise a frame 1, one or more processing units 2 supported on the frame, and also a drive unit 3. In FIG. 1 the machine is shown to comprise only one processing unit in the form of a delimbing unit for positioning the tree trunks from above. The machine, however, may, of course, comprise further processing units for slashing and barking, or any combination of such processing units. Furthermore, at least that portion of frame 1 which supports the delimbing unit 2 and the feeding device according to the invention, here designated generally by 4, may be mounted fixed or pivotal about a vertical axis (not shown) so that said portion can be adjusted to different angular positions relative to the longitudinal direction of the machine, and/or about an axis (not shown) perpendicular to the feed direction of the tree through the machine for adjusting said portion of the frame to different angular positions to the ground surface. The feed direction of the trees or tree trunks through the machine is indicated by the arrow 5 in FIG. 1.

The feeding device 4 according to the invention comprises at least two feed rolls 6, which are located each on one side of a feed path for the undelimbed tree trunks to be fed through the machine and its delimbing unit 2, and possibly also through and/or past further processing units disposed before or after the feed rolls 6, seen in the feed direction indicated by the arrow 5. The feed rolls may be provided with teeth, quills, grooves or other gripping members to improve the engagement between the feed rolls and a tree trunk 7 lying therebetween. See FIGS. 2 and 3, in which also by dash-dotted lines a tree trunk 8 having a very small diameter, and the corresponding position of the feed rolls 6 are shown. During the feeding operation, the tree trunk 7 is carried on the feed path, which may consist of support rollers (not shown), other support members and/or an entirely or partially covered plane or a channeled bottom 9. The feed rolls are capable of being pivoted inward and outward each by a supporting arm 10 so that trunks with different cross-sectional dimensions can be inserted between the feed rolls 6 and be advanced by the same. The supporting arms 10 are pivotal each about a swing axis 11 and so interconnected that the inward and outward swing movements of the two feed rolls 6 in relation to the trunk 7 lying between the rolls take place simultaneously and are of equal size. The trunk during its feed is hereby centered in the apparatus. At the embodiment shown, the connection between the supporting arms 10 consists of a pivotal arm 12 attached to each supporting arm and a link 13, at which the two pivotal arms 10 are hinged. A piston rod 14 for a hydraulic cylinder 15 is hingedly connected to said link 13. Said hydraulic cylinder is shown single-acting to actuate the feed rolls to swing inward against a tree trunk lying therebetween, and to produce the pressure required for advancing the trunk. At other embodiments, of course, a double-acting hydraulic cylinder can be applied to actuate both the inward and outward swing movements of the feed rolls. The cylinder 15 is mounted movably in a support 16 for a shock-absorbing spring package 17, which includes spring washers or other spring means and is connected to the cylinder at its end remote from the support 16. The return or outward swing movement of the feed rolls 6 for positioning a new trunk is effected by means of a compression spring 18, which is connected to the link 13 via a wire 19, a rod or the like and which upon the inward swing movement of the feed rolls by the hydraulic cylinder is charged to return or swing outward the feed rolls 6 when the pressure in the hydraulic cylinder 15 is relieved.

The feed rolls 6 are rotatable each about a rotation axis 20 in the direction indicated by the arrow 21 and, respectively, 22 and are driven each by a motor, which is not shown in the drawings but may be, for example, a hydraulic motor built-in in the associated feed roll.

The feed rolls 6 are according to the invention of conical or substantially conical shape, i.e. the generatrix need not be a straight line, but may be arc-shaped without disregarding the object of the invention, and the rotation axes 20 are inclined toward or away from each other at an angle $\alpha$ to the horizontal plane 23 in FIGS. 2 and 3. The angle $\alpha$ is to some extent determined by the base angle $\beta$ of the conical feed rolls, i.e. the angle between the side surface and base of the feed roll, and preferably should be such that the sides of the feed rolls facing toward each other are substantially in parallel and perpendicular to the horizontal plane 23, i.e. of equal size, as shown in FIGS. 2 and 3. In any case, the angle $\alpha$ must not deviate from the angle $\beta$ to such an extent, that the feed rolls 6 apply to the tree trunk lying therebetween such a force as to displace the trunk out of the feed rolls. The angle $\beta$, however, may within certain definite limits be made both smaller and greater than the angle $\alpha$, without abandoning the conception of the invention. In FIGS. 2 and 3, the angles $\alpha$ and $\beta$ are shown to be 70°, but of course other angles smaller than 90° and greater than 0° can be imagined.

In FIGS. 2 and 3, furthermore, the swing axis 11 of the support arms carrying the feed rolls is not locked to a definite angle to the horizontal plane 23, but can be arranged with any angle to said plane, independently of the inclination of the rotation shaft of the associated feed roll. In FIG. 2, for example, the swing axes 11 are arranged perpendicular in relation to the horizontal plane 23, and the bottom 9 of the machine stand may be made flat, i.e. in parallel with said plane, between the feed rolls 6 in their fully outward swung position. FIG. 3 shows, as one more of many alternatives, the swing axles 11 arranged at an angle to the horizontal plane 23 which is of equal size as the angle between said plane and the rotation axis 20 of the associated feed roll, i.e. the swing axes 11 and rotation axles 20 are arranged in parallel relative to each other. The stand bottom 9 is here preferably designed with sides sloping toward the centre of the feed path and extending perpendicularly in relation to the swing axes 11.

By the arrangement of the feed rolls 6 as shown, the circumferential speed of the feed rolls will be highest close to the stand bottom 9, or the plane on which the tree trunks are supported, and decrease with increasing height above said plane. The relation is inverse as regards the force which the feed rolls are capable to apply to a tree trunk. Hereby, a trunk with small diameter will be advanced at a considerably higher speed than a trunk with greater diameter. The greater the diameter of a tree, the higher up the point of engagement between the trunk and the feed rolls will be. Thereby, the speed will decrease, but as a compensation the feed force will increase. The real speed (force) depends also on the angle $\beta$, and by increasing or decreasing this angle the speed can also be changed. This can be realized by designing the feed rolls exchangeable, in which case axes 24 carrying the feed rolls must be attached to the respective support arms 10 so as to be adjustable to different angular positions and thereby render it possible to adjust the angle $\alpha$ between the rotary axes and the horizontal plane 23 in agreement with the base angle $\beta$ of the new feed rolls. Furthermore, the speed (force) can be changed by arranging the feed rolls 6 as a unit liftable and lowerable in relation to the plane carrying the trunks, or displaceable in relation to said plane in the case of horizontal feed rolls. Hereby the point of engagement between trunk and feed rolls can be changed even for trunks having the same diameter and thereby render it possible to adjust both the speed and the force to the individual case. This is an advantage, because trunks with the same diameter may have branches of varying thickness and thereby offer varying resistance to advancement through, for example, a delimbing machine.

The present invention is not restricted to the embodiments described above and shown in the Figures, but may be modified in many different ways within the scope of the conception of the invention. The feeding device according to the invention, for example, may be applied also to such delimbing machines or other processing units where the trunks are positioned from the side, implying that the feed rolls are to be arranged above and beneath the trunks to be advanced. Such a device is obtained most simply by turning at the embodiments shown that frame portion, which carries the feed device and delimbing unit 2, through 90° about an axis extending horizontally in the longitudinal direction of the apparatus shown in FIG. 1. Hereby, the plane 23 in FIGS. 2 and 3 will form a vertical plane, and the feed roll thereby constituting the lower feed roll may preferably be arranged stationary, i.e. not pivotal as is the case at the embodiments shown in the drawings. When the rotation axles are inclined away from each other, the feed rolls must be arranged inversely to those in the Figures.

What we claim is:

1. A feeding device for advancing undelimbed tree trunks along a feed path to and through a delimbing unit for delimbing the trunks, comprising a pair of rotatable feed rolls arranged opposite each other on one side of the feed path and supported on rotation shafts, said rotation shafts being supported on a base, said feed rolls having side surfaces adapted to contact a tree trunk, characterized in that said rotation shafts of said feed rolls are arranged substantially to angle inwardly with respect to said tree trunk, the angles of each of said rotation shafts being equal with respect to said base, said shafts intersecting one another at their imagined extensions at an angle the bisector plane of which has substantially the same perpendicular distance to all points on the side surfaces of the feed rolls facing toward said plane, all points on the side surface of either of said pair of feed rolls facing said plane being located at the same radial distance from the corresponding points on the side surface of the other of said pair of feed rolls.

2. A feeding device according to claim 1, characterized in that the feed rolls are arranged on a pivotal support arm for simultaneous inward and outward movements of the feed rolls about swing axles which are angularly adjustable in relation to the rotation shafts.

3. A feeding device according to claim 1, in that the angle between the axis of the rotation shafts and the horizontal is substantially the same as the angle between the side surface and the base of the feed rolls.

4. A feeding device according to claim 1, characterized in that the feed rolls are shaped substantially conically and incline with their respective rotation axes toward each other.

5. A feeding device according to claim 1, characterized in that at least one feed roll is arranged movable relative to the other feed roll.

* * * * *